United States Patent
Thibodeau et al.

(10) Patent No.: US 10,890,380 B2
(45) Date of Patent: Jan. 12, 2021

(54) PRECAST REPLACEMENT SURFACES FOR CONTACT WITH HEATED METAL

(71) Applicant: VESUVIUS USA CORPORATION

(72) Inventors: Joshua Thibodeau, Valparaiso, IN (US); Elwood Rothrock, Crown Point, IN (US); Vincent A. Nelson, Demotte, IN (US)

(73) Assignee: VESUVIUS USA CORPORATION, Champaign, IL (US)

(*) Notice: Subject to any disclaimer, the term of this patent is extended or adjusted under 35 U.S.C. 154(b) by 360 days.

(21) Appl. No.: 15/768,926

(22) PCT Filed: Sep. 27, 2016

(86) PCT No.: PCT/US2016/053910
§ 371 (c)(1),
(2) Date: Apr. 17, 2018

(87) PCT Pub. No.: WO2017/074631
PCT Pub. Date: May 4, 2017

(65) Prior Publication Data
US 2019/0078841 A1    Mar. 14, 2019

Related U.S. Application Data

(60) Provisional application No. 62/248,048, filed on Oct. 29, 2015.

(51) Int. Cl.
| F27D 1/14 | (2006.01) |
| C04B 35/66 | (2006.01) |
| F27D 1/06 | (2006.01) |
| F27D 1/16 | (2006.01) |

(52) U.S. Cl.
CPC ............ *F27D 1/144* (2013.01); *C04B 35/66* (2013.01); *F27D 1/06* (2013.01); *F27D 1/14* (2013.01); *F27D 1/1626* (2013.01)

(58) Field of Classification Search
CPC ...................................................... F27D 1/144
See application file for complete search history.

(56) References Cited

U.S. PATENT DOCUMENTS

| 4,086,740 | A | 5/1978 | Annett |
| 4,698,948 | A | 10/1987 | Yamashita et al. |
| 4,958,964 | A | 9/1990 | Soto et al. |
| 5,118,216 | A | 6/1992 | Smith |
| 5,142,839 | A | 9/1992 | Kraemer |
| 5,984,672 | A | 11/1999 | Takigawa |
| 10,400,294 | B2 | 9/2019 | Cartmill |

FOREIGN PATENT DOCUMENTS

| CN | 202532891 U | 11/2012 |
| CN | 104395620 A | 3/2015 |
| JP | 2014234865 A | 12/2014 |
| TW | 201632631 A | 9/2016 |

*Primary Examiner* — Larry W Thrower
(74) *Attorney, Agent, or Firm* — Thomas Clinton

(57) ABSTRACT

A replacement product for a portion of a castable refractory surface contains a precast refractory piece with accommodation for an adjustable positioning structure for conforming the working surface of the precast refractory piece to the castable refractory surface. A process for installing the precast refractory piece includes positioning the precast refractory piece with respect to the castable refractory surface, and introducing castable material into an interface volume between the precast refractory piece and the castable refractory surface.

5 Claims, 4 Drawing Sheets

PRECAST REPLACEMENT SURFACES FOR CONTACT WITH HEATED METAL

BACKGROUND OF THE INVENTION

(1) Field of the Invention

The present invention relates to devices for containing, supporting or transporting solid heated metal. In particular, the invention relates to a precast replacement surface for contact with solid heated metal, for example, in extractor slots in reheat furnaces, or for reheat steel at the point at which it exits a reheat furnace. The invention also relates to the installation of a precast replacement surface in a vessel, melter or furnace for containing, supporting or transporting heated metal.

(2) Description of the Related Art

Various metallurgical vessels, such as furnaces and melters, are used to contain or transport solid heated metal in metallurgical processing. In these vessels, enclosing and supporting refractory structures come in contact with the heated metal and are subject to chemical attack as well as thermal and mechanical stresses. Vessels of this type include reheat vessels such as rotary reheat furnaces, batch forge furnaces, car bottom forge furnaces, bottom slot forge furnaces, aluminum primary and secondary batch and holding furnaces, top charge round melters, and annealing and normalizing furnaces. The invention herein is described in relation to reheating furnaces, but is applicable to any metallurgical vessel containing a refractory surface that may be in need of repair due to the mechanical, thermal or chemical action of heated metal on the refractory surface.

Reheating furnaces are used in hot rolling mills in steel plants to heat steel stock (billets, blooms or slabs) to temperatures at which the steel deforms and may be rolled in a mill. The steel stock is inserted into the reheating furnace at a furnace entrance, is conveyed through the reheating furnace, and is discharged from the reheating furnace at the furnace exit. At the furnace exit, the action of gravity or suitable mechanical means, such as a mechanical extractor, may be used to transfer the heated steel stock to a roller table to a rolling mill. A burner is used to heat the interior of the reheating furnace. Heat is transferred to the steel by convection and radiation from the burner gases and by conduction through the furnace walls.

In a continuous pusher furnace, cold steel stock is pushed forward by the action of pushers at the charging side, and heated. Refractory surfaces may be used to support the heated steel at the discharge side of the furnace.

In a walking beam furnace, water cooled steel members lined with refractory material are actuated hydraulically or mechanically to move the steel stock through the furnace. Refractory surfaces may be used to support the heated steel at the discharge side of the furnace.

In a walking hearth furnace, steel stock is supported on fixed refractory piers. The hearth is raised to support the steel stock, and is then raised an additional distance so that the steel stock is raised above the refractory piers. The hearth is then moved forward, and lowered so that the steel stock is supported on the refractory piers in a new position. The hearth is then returned to its original position to repeat the cycle of moving the steel stock forward. Refractory surfaces may be used to support the heated steel at the discharge side of the furnace.

Insulating refractories are used to prevent heat loss throughout the furnace structure. Typically, bricks are used to support a layer of monolithic refractories facing the interior of the reheat furnace and the reheated steel. Bricks that may be used in this application include acid bricks containing an amount equal to or more than 92 wt % silicon dioxide, semi-basic bricks containing an amount equal to or more than 65 wt % silicon dioxide and an amount from and including 1 wt % to and including 30 wt % alumina, neutral bricks containing an amount equal to or more than 30 wt % alumina, basic bricks containing an amount equal to or greater than 60 wt % magnesium oxide, and bricks containing nitride and carbide materials such as silicon carbide.

Monolithic refractories that may be used in this application include castable materials, moldable materials and ramming mixtures. Suitable materials for this application may contain from and including 60 wt % alumina to and including 100 wt % alumina.

A reheat furnace exit may be configured to accommodate an extractor or lifter. The exit configuration may include refractory pieces that form notches or a square-toothed pattern in the horizontal plane, and are arranged to interlock with a portion of the lifter. A work piece to be removed from the reheat furnace may be moved into position on the refractory pieces of the reheat furnace exit. Interlocking portions of the extractor are engaged with the refractory pieces of the reheat furnace exit, and are lifted to remove the work piece from the reheat furnace exit.

Refractory structures at a reheat furnace exit are typically constructed of a base layer of precast brick and a top layer of castable material. These layers of brick and castable material are supported with a steel structure that may include "I" beams. Perimeter plates and water cooled support plates may be used in the support structure.

The refractory material on which heated steel rests within, or exits from, a reheat furnace provides a solid even surface for the production of quality steel. However, this refractory material is subject to thermal stress, physical stress and abrasion. These forces compromise the shape and integrity of the refractory material. Once these refractory surfaces become worn and stressed they need to be repaired. Unrepaired refractory can compromise the quality of the steel slab that is being moved across it. Current technology makes use of gunite or shotcrete material to make short-term repairs to refractory surfaces exposed to contact with reheated steel. Additional refractory is sprayed on the worn section. Such repairs will last until the bond between the layer of shotcrete and the repaired refractory is broken. When the bond is broken, the layer of shotcrete will be pushed out of the furnace. Another option, the removal of large sections of refractory, rebricking the hearth or exit area and pumping or shotcreting the lining back into place, is expensive and time-consuming. Pumping the lining back into place produces a lining with better refractory characteristics than a shotcreted lining, but a pumped lining requires a lengthier period of time to dry the lining out than does a shotcreted lining. Brick has good refractory properties and requires no drying out, but brick requires a surface refractory coating so that scale from heated slabs does not penetrate joints between bricks. Additionally, the installation of brick layers is time-consuming.

As used herein, the term "shotcrete" is used to describe a concrete or mortar material that is sprayed with either a dry or wet mix process. In the wet mix application process, previously prepared concrete, such as ready-mixed concrete, is pumped to a nozzle. Compressed air is supplied to the nozzle to impel the concrete onto a surface. In the dry mix application process, dry ingredients are placed in a vessel and are conveyed pneumatically to a nozzle. Water is supplied to the nozzle to impel a mixture of dry ingredients to a surface. The complete mixture of water and the dry mixture occurs at the surface.

BRIEF SUMMARY OF THE INVENTION

The present invention makes use of a precast replacement block that can be precisely positioned in an existing structure in a furnace, such as a reheat furnace. The precast replacement block may be used, for example, in the hearth of a reheat furnace or in the extractor slot structure of a reheat furnace.

Precast refractory material is generally more resistant to thermal stress and mechanical action than is refractory material that is cast in place. As a facing material, castable material typically requires more repair or replacement than does precast material. However, repair of a cast facing surface with a precast piece introduces the complications of properly positioning the precast piece on the surface, supporting the precast piece in place during the installation process, and anchoring the precast piece in place.

Accordingly, the present invention relates to a precast piece having a positioning structure that allows the precast block to be adjustably placed into a position on a refractory surface, and adjustably supported in a position on the refractory surface. Certain embodiments of the invention have no metal positioning structure that is exposed on the working surface of the precast piece. The positioning structure permits mortar to flow under the precast piece.

The present invention also relates to the process of repairing the surface of a refractory structure by inserting a precast refractory piece into the surface.

In one embodiment of the repair process, a recess able to accommodate the entire volume of a precast piece having a facing surface is formed in the refractory structure to be repaired. A precast piece having one or more positional adjustment mechanisms is inserted into the recess so that the positional adjustment mechanisms are oriented toward a surface of the recess, such as the bottom surface of the recess. The positional adjustment mechanisms are adjusted so that the facing surface of the refractory piece is coplanar to the facing surface of the refractory structure to be repaired, or so that the facing surface of the refractory piece is parallel to, and elevated with respect to, the facing surface of the refractory structure to be repaired. Mortar is then poured into the volume defined between the precast piece and the interior of the recess.

In another embodiment of the repair process, a mold configured to house a precast piece and partially enclose a volume beneath a precast piece is engaged to a refractory structure to be repaired. Damaged or worn material is first removed from the structure to be repaired. In a typical configuration, the mold is attached to one or more lateral surfaces of the precast piece and extends downwardly from the precast piece. The mold, together with the precast piece and a prepared portion of base refractory to be repaired, defines a volume into which mortar or filler can be placed. The mold is provided with at least one pour hole through which mortar or filler can be introduced to a fill volume defined by a surface of the refractory piece, the interior of the mold, and the prepared portion of the refractory to be repaired. The mold may also be provided with breather holes, typically located at the intersection of the bottom of the precast piece and the mold, that enable air to be vented from the fill volume as mortar or filler is inserted or pumped into the fill volume. A precast piece having one or more positional adjustment mechanisms is inserted into the mold so that the positional adjustment mechanisms, such as a threaded rod engaged by an internally threaded plate or nut contained within a channel extending between the upper surface of the precast piece and the lower surface of the precast piece, are oriented toward the body of the refractory. The positional adjustment mechanisms are adjusted so that the facing surface of the refractory piece is oriented in a selected plane and position.

One or more holding pin channels may be provided in the precast refractory piece; the holding pin channels extend from an upper surface to a lower surface of the precast refractory piece. The holding pin channels are used to align a drill and a bit. The drill bit is introduced into a holding pin channel, and extended until it is in contact with the refractory material to be repaired. A hole, coaxial with the holding pin channel, is then drilled into the refractory material to be repaired. The bit and drill are then removed and a holding pin is inserted into the holding pin channel and into the aligned hole in the refractory material to be repaired. The holding pin may be of such a length that, when it is installed in the holding pin channel, its upper end does not extend to the upper surface of the precast refractory piece. Mortar is then poured into the volume defined between the precast piece and the interior of the mold. The upper end of the holding pin channel is filled with a holding pin channel fill material. The mortar is permitted to set or heated to set. The positional adjustment mechanisms may be removed from the preset piece and the channels occupied by the positional adjustment mechanisms may be filled with a filler material.

Materials used for the precast piece may contain from and including 55 wt % alumina to and including 95 wt % alumina and may or may not contain spinel. The filler material may contain from and including 40 wt % alumina to and including 100 wt % alumina. The holding pin channel filling material may contain from and including 50 wt % alumina to and including 100 wt % alumina, or from and including 75 wt % to and including 95 wt % alumina, for example 85 wt % magnesite.

DETAILED DESCRIPTION OF THE INVENTION

Figure 1:
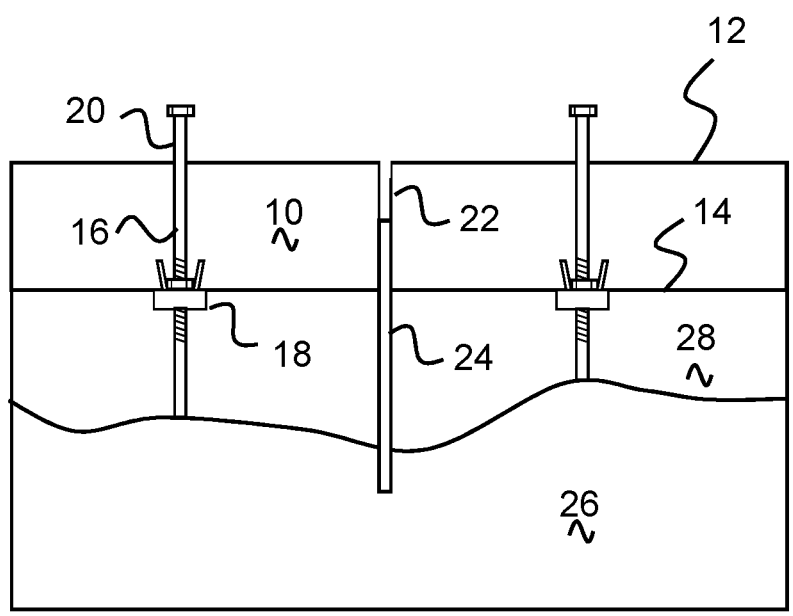
FIG. 1 shows a vertical cross-section of a precast replacement block according to the invention.

FIG. 1 depicts a precast refractory piece 10 according to the preset invention. Precast refractory piece 10 comprises a first surface or upper surface 12, and a second surface or bottom surface 14 disposed opposite to first surface 12. An engagement channel 16 extends through precast refractory piece 10 from first surface 12 to second surface 14. An adjustable engagement device 18 is arranged in contact with second surface 14 and in communication with the engagement channel 16. In certain configurations, adjustable engagement device 18 comprises a bore, and engagement channel 16 and adjustable engagement device 18 are coaxial. Lifting rod 20 is disposed in engagement channel 16, and is adjustably engaged to adjustable engagement device 18. In certain configurations of the device, lifting rod 20 comprises a threaded lateral surface, and is threadedly engaged to adjustable engagement device 18. Lifting rod 20 may be composed of a metallic material, or may be composed of a nonmetallic material. In certain embodiments of the device, one or more, or a plurality of, holding pin channels 22 extend through refractory piece 10 from first surface 12 to second surface 14. A holding pin 24 inserted in holding pin channel 22 is oriented to protrude from the second surface of precast refractory piece 10, to engage a refractory structure to be repaired 26, and to maintain the position of precast refractory piece 10 with respect to the refractory structure to be repaired after the repair process is completed, and during use of the refractory vessel or device. The holding pin 24 may be configured to be recessed from the first surface 12 of precast refractory piece 10 after precast refractory piece 10 is installed; the unoccupied portion of holding pin channel 22 may be filled with mortar or a filler material. Holding pin channels 22 may be perpendicular to first surface 12, or may form a nonperpendicular angle to first surface 12. Holding pin 24 may impart resistance of precast refractory piece 10 to lateral motion, or motion in the plane of first surface 12.

Holding pins 24 are used with a precast refractory piece 10 of the invention in the following manner: One or more holding pin channels 22 are provided in precast refractory piece 10. The holding pin channels 22 have a diameters slightly larger than the diameters of holding pins 24. For example, holding pin channels 22 may have a 25 mm diameter, and holding pins 24 may have a 22 mm diameter. The precast refractory piece 10 is set into position using lifting rod 20. Holding pin channels 22, in which holding pins 24 are not present, are used to align a drill and a bit. The drill bit is introduced into a holding pin channel 22, and extended until it is in contact with the refractory material to be repaired. A hole, coaxial with holding pin channel 22, is then drilled into the refractory material to be repaired, to a depth, for example, within the range from and including 7.5 cm to and including 30 cm. The bit and drill are then removed and a holding pin 24 is inserted into the holding pin channel 22 and into the aligned hole in the refractory material to be repaired. Mortar or filler is then introduced into an interface volume 28 between precast refractory piece 10 and the refractory structure to be repaired. Holding pin 24 may be recessed in holding pin channel 22, and mortar or filler may be introduced into the countersunk portion of holding pin channel 22. One or more holding pins 24 maintain the precast refractory piece 10 in position during use of the refractory vessel or device; this configuration is particularly useful if the precast refractory piece is exposed, in use, on one or more of its lateral surfaces.

Figure 2:
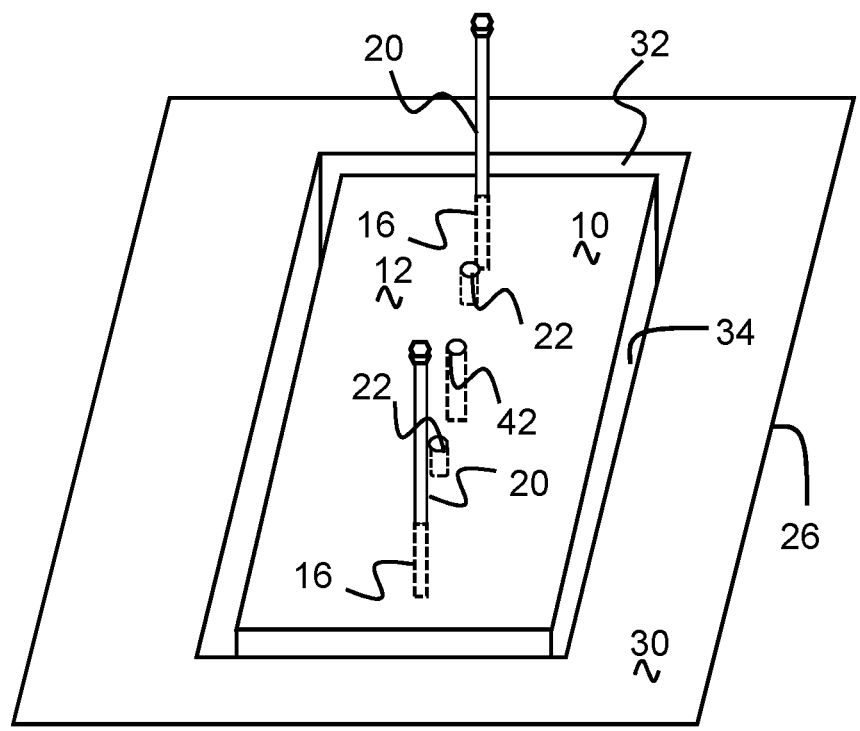
FIG. 2 is a perspective drawing of a precast replacement block of the invention installed within a refractory surface.

FIG. 2 depicts the use (in a "recess installation" technique) of a refractory piece 10 of the present invention in the repair of the surface 30 of refractory structure 26. In order to repair the surface 30 of refractory structure 26, a recess 32 is formed in surface 30 to accommodate precast refractory piece 10 and to allow for a surrounding volume 34 between refractory structure 26 and precast refractory piece 10. Precast refractory piece 10 is then placed into recess 32, and the position of precast refractory piece 10 is adjusted by the manipulation of lifting rod 20. For example, precast refractory piece 10 may be arranged so that its exposed surface is coplanar with a surface 30 of refractory structure 26. Precast refractory piece 10 is then fixed in place by the insertion of castable refractory into the unoccupied portion of recess 32, including the unoccupied volume beneath refractory piece 10. Holding pin channels 22 serve as guides for drilling channels into the underlying portion of refractory structure 26. Holding pin channels 22 accommodate holding pin 24 that are recessed from the refractory piece upper surface 12.

In a metallurgical vessel, such as in the hearth of a furnace, it may be desirable to install the precast shape in a location in which access to the bottom surface of the precast shape is limited when the precast shape is placed into position. In such a location, there is insufficient space between the precast shape and the surrounding refractory material for filler material or mortar to be easily introduced into the interface volume 28 around, and beneath, the precast shape. The use of form walls to surround the precast shape is not effective in such circumstances. In such circumstances, the precast shape may be installed by using the lifting rod mechanism previously described, and by providing the precast shape with a pumping port 42 extending from the top surface of the precast shape to the bottom of the precast shape. The cross-section of the pumping port will be sufficient to permit filler or mortar to be pumped into the volume beneath the precast shape, and the volume between the precast shape and existing refractory, but will not be so extensive as to form a significant proportion of the top surface of the precast shape. The pumping port may have a circular horizontal diameter in the range from and including 2 cm to and including 20 cm, from and including 2 cm to and including 15 cm, or from and including 4 cm to and including 15 cm, or may have a cross-sectional horizontal area in the range from and including 2 $cm^2$ to and including 70 $cm^2$, from and including 4 $cm^2$ to and including 40 $cm^2$, or from and including 6 $cm^2$ to and including 25 $cm^2$.

After the volume between precast refractory piece 10 and refractory structure 30 is filled, lifting rods 20 are removed from engagement channels 16. Engagement channels 16 and the upper portions of holding pin channels that are not occupied by holding pins are filled with mortar or filler.

Figure 3:
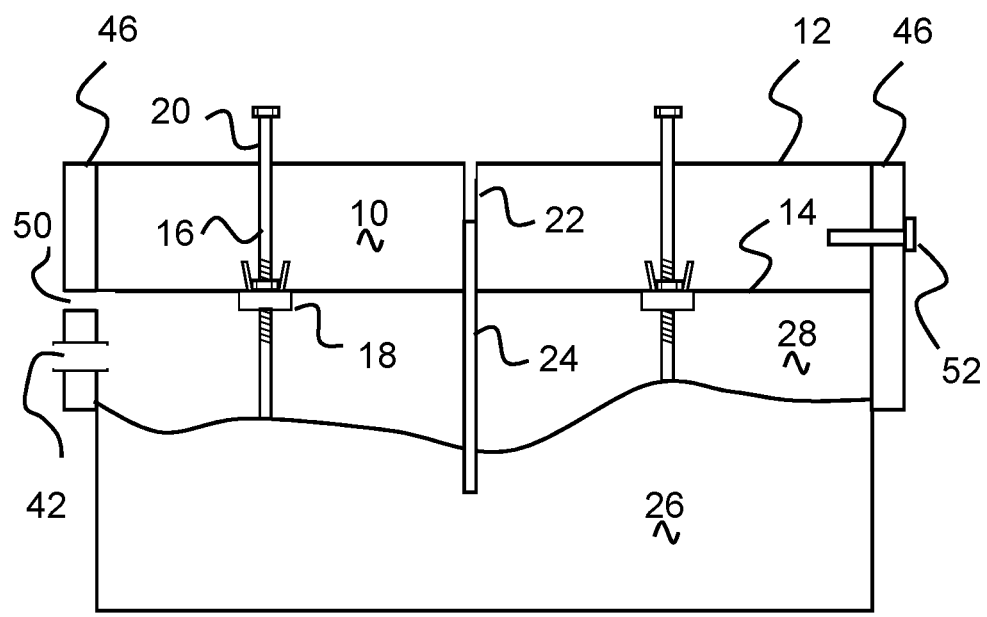
FIG. 3 is a vertical cross-section drawing of a precast replacement block of the invention being installed, within a mold, on a refractory surface.

FIG. 3 depicts the use (in a "form walls" technique) of a precast refractory piece 10 of the invention in repair of the surface of a refractory structure 26. FIG. 3 depicts a first surface or upper surface 12 of refractory piece 10, and a second surface or bottom surface 14 disposed opposite to first surface 12. An engagement channel 16 extends through precast refractory piece 10 from first surface 12 to second surface 14. An adjustable engagement device 18 is arranged in contact with second surface 14 and in communication with the engagement channel 16. In certain configurations of the device, engagement channel 16 and adjustable engagement device 18 are coaxial. Lifting rod 20 is disposed in engagement channel 16, and is adjustably engaged to adjustable engagement device 18. In certain configurations of the device, lifting rod 20 comprises a threaded lateral surface, and is threadedly engaged to adjustable engagement device 18. Lifting rod 20 may be composed of a metallic material, or may be composed of a nonmetallic material. In certain embodiments of the device, one or more, or a plurality of, holding pin channels 22 extend through refractory piece 10 from first surface 12 to second surface 14. A holding pin 24 inserted in holding pin channel 22 is configured to engage a refractory structure to be repaired 26 and to maintain the position of precast refractory piece 10 with respect to the refractory structure to be repaired after the repair process is completed, and during use of the refractory vessel or device. The holding pin 24 may be configured to be recessed from the first surface 12 of precast refractory piece 10 after precast refractory piece 10 is installed; the unoccupied portion of holding pin channel 22 may be filled with mortar or a filler material. Holding pin channels 22 may be perpendicular to first surface 12, or may form a nonperpendicular angle to first surface 12. Holding pin 24 may impart resistance of precast refractory piece 10 to lateral motion, or motion in the plane of first surface 12.

Form walls 46, having interior form wall surfaces and exterior form wall surfaces, are attached to at least one, or at least two, lateral surfaces of the precast shape to partially enclose, in cooperation with the second surface of the precast piece, an interface volume 28 between the existing refractory into which the precast piece is being installed, and the precast piece itself. Attachment of the form walls to the refractory piece may be accomplished, for example, by providing holes in the form walls, providing holes in surfaces of the precast shape that are configured to align with the holes in the form walls, and by using attachers 52, such as bolts or screws, to attach the form walls 46 to the refractory piece 10. The form walls may, for example, be attached to one or more lateral surfaces of the precast shape, and may extend downwardly from the lateral surfaces of the precast shape. The precast shape may also be provided with a pumping port 42 extending from an exterior surface of the form to an interior surface of the form. The cross-section of the pumping port will be sufficient to permit filler or mortar to be pumped into the volume beneath the precast shape, and the volume between the precast shape and existing refractory, but will not be so extensive as to form a significant proportion of the top surface of the precast shape. The pumping port may have a circular horizontal diameter in the range from and including 2 cm to and including 20 cm, from and including 2 cm to and including 15 cm, or from and including 4 cm to and including 15 cm, or may have a cross-sectional horizontal area in the range from and including 2 $cm^2$ to and including 70 $cm^2$, from and including 4 $cm^2$ to and including 40 $cm^2$, or from and including 6 $cm^2$ to and including 25 $cm^2$. The form walls may also be provided with at least one breather hole 50, or a plurality of breather holes, extending from an inner side of the form wall to the outer side of the form wall. The breather holes are sufficiently large to allow air to escape and not become trapped during the pumping or insertion of filler material into the volume or void between the existing refractory into which the precast piece is being installed, but are not sufficiently large as to allow a significant quantity of mortar or filler to escape. Breather holes may have a circular horizontal diameter in the range from and including 1.5 mm to and including 25 mm, from and including 2 mm to and including 20 mm, or from and including 3 mm to and including 12 mm, or may have a cross-sectional horizontal area in the range from and including 7 $mm^2$ to and including 120 $mm^2$, from and including 10 $mm^2$ to and including 100 $mm^2$, or from and including 15 $mm^2$ to and including 60 $mm^2$. In the embodiment shown, the breather hole 50 is located above the level of pumping port 42 in a form wall 46. In the embodiment shown, the breather hole is located adjacent to the second surface 14 of the precast refractory piece.

Figure 4:
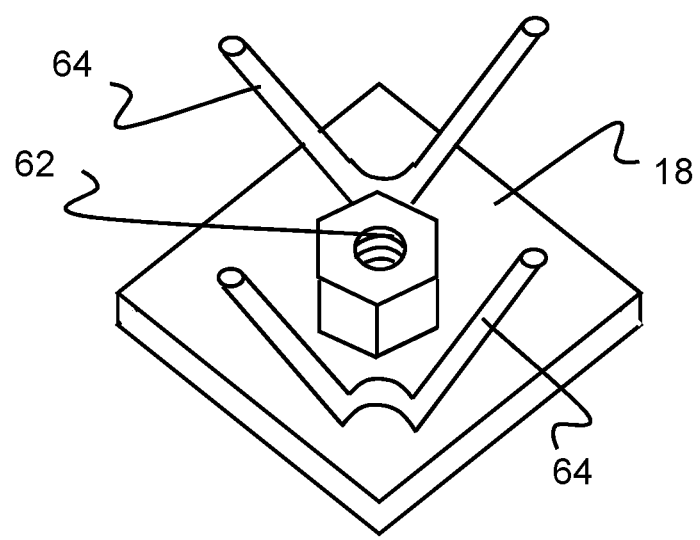
FIG. 4 is a perspective drawing of an adjustable engagement device that may be incorporated into the invention.

FIG. 4 depicts an adjustable engagement device 18 according to the invention. Adjustable engagement device 18 is disposed in communication with a precast refractory piece of the invention, and is capable of supporting it. Adjustable engagement device 18 may also be disposed in communication with a lifting rod that may be provided within an engagement channel. Manipulation of the lifting rod enables the precast refractory piece to be positioned with respect to a castable refractory structure to be repaired. The lifting rod and adjustable engagement device are provided with interacting geometries 62 that permit controlled relative motion. The interacting geometries may be toothed geometries, ratchet geometries or threaded geometries. Adjustable engagement device 18 may be provided with prongs 64 to immobilize the adjustable engagement device with respect to the precast refractory piece.

A precast shape may be installed in a refractory surface of a metallurgical vessel by use of the form walls technique. In this technique, worn existing refractory is removed from the metallurgical handling device, such as the extractor portion of a reheat furnace. The removal may be accomplished by cutting out the area to be replaced with a concrete saw, and removing refractory within the area with a jackhammer. For the installation of a precast shape with a depth of 5, 10 or 15 cm, refractory may be removed to a depth of approximately 25 cm. After the worn refractory is removed, the precast shape is set onto brick rollers, and is moved into position on the brick rollers so that it is located over the area in which it is to be installed. Lifting rods are then installed in the lifting channels of the precast shape, and are manipulated to lift the shape off the brick rollers. The rollers are then moved out of the way and the precast shape is lowered to the desired elevation by manipulation of the lifting rods. If holding pin channels are present in the precast shape, a drill is used to produce a hole, aligned with the holding pin channel, in the underlying refractory layer beneath the precast piece. Holding pins, which may be fabricated from stainless steel, are then placed into position in the holding pin channels.

The form walls technique additionally includes the installation of form walls in communication with the precast refractory piece. The form walls are moved into a position in communication with the precast refractory piece, typically in lateral communication with the precast refractory piece. The form walls are provided with attachment structures, such as bores, configured to engage corresponding attachment structures on the precast refractory piece. For example, the form wall attachment structures and the precast refractory piece attachment structures may comprise bores that may accommodate bolts to fix the form walls in a fixed position with respect to the precast refractory piece. The form walls may be provided with breather holes that may be arranged so that the flow of castable refractory, such as shotcrete, into a volume between the precast refractory piece and the refractory to be repaired can be accomplished without the formation of voids. Typically, breather holes are located in the form walls at the uppermost portion of the unoccupied volume enclosed by the refractory to be repaired, the precast refractory piece and the form walls. The form walls are also provided with a pump port disposed between the exterior and the interior of the volume partly enclosed by the form walls. A volume of filler material such as shotcrete is prepared, and it is confirmed that the breather holes in the form wall are open. The filler material is then pumped through the pump port provided in the form wall. Pumping continues until the filler material is seen to be exiting the breather holes in the form wall. The pump is then deactivated and removed. The form walls and lifting rods are kept in position while heat is applied to the filler material to set it in place; typical filler materials require approximately 6 hours to set. Once the filler material has hardened, the form walls and lifting rods are removed. The voids in the precast shape used to accommodate the lifting rods and holding pins are then filled with a filling material or mortar such as an alumina-containing or magnesite-containing formulation. The vessel or structure containing the inset precast shape is now ready to be used in service.

A precast shape may be installed in a refractory surface of a metallurgical vessel by use of the recess installation technique. This technique may be used when the portion of refractory material to be replaced forms, on its removal, a recess that is capable of holding mortar or filler in place.

In the recess installation technique, worn existing refractory is removed from the face surface of a metallurgical vessel. The removal may be accomplished by cutting out the area to be replaced with a concrete saw, and removing refractory within the area with a jackhammer. For the installation of a precast shape with a depth of 5, 10 or 15 cm, refractory may be removed to a depth of approximately 25 cm. After the worn refractory is removed, the precast shape is set onto brick rollers, and is moved into position on the brick rollers so that it is located over the area in which it is to be installed. The precast refractory piece used in this technique is provided with a pump port extending from the first surface of the precast refractory piece to the second surface of the precast refractory piece, or from the top of the precast refractory piece to the bottom of the precast refractory piece. Lifting rods are then installed in the lifting channels of the precast shape, and are manipulated to lift the shape off the brick rollers. The rollers are then moved out of the way and the precast shape is lowered to the desired elevation by manipulation of the lifting rods.

A volume of filler material such as shotcrete is prepared, and it is confirmed that the breather holes in the form wall are open. The filler material is then pumped through the pump port provided in the precast refractory shape. Pumping continues until all voids that can be seen are filled. The pump is then deactivated and removed. The lifting rods are kept in position while heat is applied to the filler material to set it in place; typical filler materials require approximately 6 hours to set. Once the filler material has hardened, the lifting rods are removed. The voids in the precast shape used to accommodate the lifting rods and holding pins are then filled with a filling or mortar formulation, such as a suitable alumina-containing or magnesite-containing formulation. The vessel or structure containing the inset precast shape is now ready to be used in service.

In general, the method of the invention for repairing the surface of a refractory structure may be practiced by supplying a precast refractory piece having a first surface and a second surface opposite to the first surface, an engagement channel extending through the precast refractory piece from the first surface to the second surface, and an adjustable engagement device in communication with the second surface and with the engagement channel. The precast refractory piece is placed in proximity to the monolithic refractory structure to be repaired, and the position of the precast refractory piece with respect to the monolithic refractory structure to be repaired is adjusted by means of rods disposed in the engagement channel and within, and interacting with, the adjustable engagement device. The precast refractory piece and the monolithic refractory structure to be repaired are arranged to partially, at least partially, or completely enclose an interface volume between the precast refractory piece and the monolithic refractory structure to be repaired. A form wall having an interior surface and an exterior surface may be attached to a lateral surface of the precast refractory piece. The precast refractory piece, the monolithic refractory structure to be repaired and the form wall, if present, partially or completely enclose an interface volume between the precast refractory piece and the monolithic refractory structure to be repaired. A pumping port extends between the first surface and second surface of the precast refractory piece, or between the interior surface and exterior surface of the form wall, to form an opening between the exterior and interior of the interface volume.

Castable refractory is inserted into the interface volume and is allowed to set. The rods are removed from the engagement channel.

The invention further relates to the use of a precast refractory piece as described herein to repair a monolithic refractory structure.

The invention further relates to a refractory vessel comprising a surface comprising a monolithic refractory, wherein the surface further comprises a precast refractory piece as described herein.

The invention further relates to the use of a refractory vessel comprising a surface composed of a monolithic refractory and containing a precast refractory piece as described herein.

ELEMENTS

10. Precast refractory piece
12. Working surface/Facing surface/First surface/upper surface
14. Second surface/bottom surface
16. Engagement channel
18. Adjustable engagement device
20. Lifting rod
22. Holding pin channels
24. Holding pin
26. Refractory structure to be repaired
28. Interface volume
30. Refractory structure surface
32. Recess in refractory structure surface
34. Surrounding volume between refractory structure and precast refractory piece
42. Pumping port
46. Form walls
50. Breather hole
52. Attachers
62. Interacting geometries
64. Prongs

We claim:

1. A precast refractory piece, comprising:
a first surface,
a second surface, disposed opposite the first surface,
an engagement channel, extending through the precast refractory piece from the first surface to the second surface,
an adjustable engagement device in communication with the second surface and with the engagement channel,
a rod disposed in the engagement channel,
a holding pin channel extending through the refractory piece from the first surface to the second surface,
a holding pin inserted in the holding pin channel, wherein the holding pin is oriented to protrude from the second surface of the precast refractory piece,
wherein the adjustable engagement device is configured to adjustably engage the rod in a fixed position in the engagement channel;
wherein the rod comprises a threaded lateral surface, and
wherein the adjustable engagement device is engaged to the rod in a threaded manner,
wherein the precast refractory piece comprises a lateral surface;
wherein a form wall having an interior surface and an exterior surface is attached to the lateral surface of the piece;
wherein the form wall partially encloses, in cooperation with the second surface of the piece, an interface volume;

wherein the form wall comprises a pumping port extending from the interior surface of the form wall to the exterior surface of the form wall, and wherein the form wall further comprises a breather hole extending from the interior surface of the form wall to the exterior surface of the form wall, and wherein the breather hole is located adjacent to the second surface of the precast refractory piece.

2. The piece of claim 1, further comprising a pumping port extending between the first surface of the precast refractory piece and the second surface of the refractory piece.

3. The piece of claim 1, wherein the engagement device comprises a bore, and wherein the engagement device bore and the engagement channel are coaxial.

4. A method for repairing the surface of a refractory structure, comprising:
   a. supplying a precast refractory piece formed according to claim 1;
   b. placing the precast refractory piece in proximity to a refractory structure to be repaired;
   c. inserting a rod in the engagement channel and within the adjustable engagement device;
   d. adjusting the rod to adjust the position of the precast refractory piece;
   e. arranging the precast refractory piece and the structure to be repaired to at least partially enclose an interface volume between the precast refractory piece and the structure to be repaired;
   f. providing a pumping port communicating between the exterior and interior of the interface volume;
   g. inserting castable refractory into the interface volume, and
   h. removing the rod from the engagement channel.

5. A refractory vessel, comprising a surface comprising a monolithic refractory structure, and further comprising a precast refractory piece formed according to claim 1.

* * * * *